United States Patent [19]

Horie

[11] 4,199,951
[45] Apr. 29, 1980

[54] PNEUMATIC BRAKE BOOSTER

[75] Inventor: Mitsuyuki Horie, Susono, Japan

[73] Assignee: Toyota Jidosha Kogyo Kabushiki Kaisha, Toyota, Japan

[21] Appl. No.: 857,460

[22] Filed: Dec. 5, 1977

[30] Foreign Application Priority Data

Jun. 22, 1977 [JP] Japan .................. 52/74185

[51] Int. Cl.² .............. F02G 3/00; B60T 13/00
[52] U.S. Cl. .................. 60/613; 60/281; 60/582; 60/547 R; 91/32
[58] Field of Search .......... 60/547 R, 554, 613, 60/614, 597, 281, 582; 123/97 B; 91/6, 32

[56] References Cited

U.S. PATENT DOCUMENTS

| | | | |
|---|---|---|---|
| 3,172,337 | 3/1965 | Randol | 60/554 |
| 3,217,487 | 11/1965 | Rothe | 60/614 |
| 3,672,160 | 6/1972 | Kim | 60/614 |
| 3,768,366 | 10/1973 | Grabb | 91/6 |
| 3,818,702 | 6/1974 | Woo | 91/6 |
| 3,877,229 | 4/1975 | Resler, Jr. | 60/597 |
| 4,051,823 | 10/1977 | Mogi | 123/97 B |

FOREIGN PATENT DOCUMENTS 49-44822 11/1974 Japan .

*Primary Examiner*—Abraham Hershkovitz
*Attorney, Agent, or Firm*—Kenyon & Kenyon

[57] ABSTRACT

In a pneumatic brake booster, positive and variable pressure chambers on opposite sides of a spring loaded diaphragm piston both communicate with an air pressure source under inoperative condition of the booster; only the positive pressure chamber communicates with the air pressure source while the variable pressure chamber communicates with atmospheric pressure in response to activation of the booster to operate the piston.

2 Claims, 2 Drawing Figures

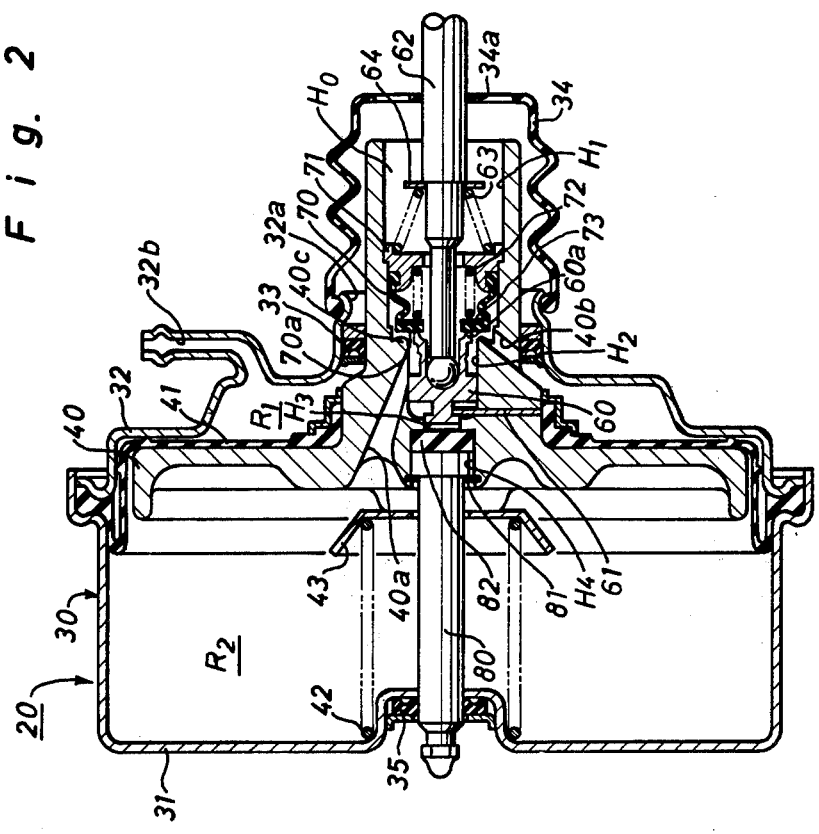

PNEUMATIC BRAKE BOOSTER

BACKGROUND OF THE INVENTION

The present invention relates to a power brake device for wheeled vehicles, and more particularly to a pneumatic brake booster wherein a spring loaded diaphragm piston is actuated by difference between a positive pressure and the atmospheric pressure.

SUMMARY OF THE INVENTION

A primary object of the present invention is to provide a pneumatic brake booster wherein positive and variable pressure chambers on opposite sides of a spring loaded diaphragm piston both communicate with an air pressure source under inoperative condition of the booster; that only the positive pressure chamber communicates with the air pressure source while the variable pressure chamber communicates with the atmospheric pressure in response to activation of the booster to operate the piston.

Another object of the present invention is to provide a pneumatic brake booster, having the above-mentioned characteristics, wherein compressed exhaust pressure supplied from an exhaust pipe of an internal combustion engine is used as the air pressure source to activate the booster.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 2 is an elevational sectional view of the brake booster.

DESCRIPTION OF THE PREFERRED EMBODIMENT

Figure 1:
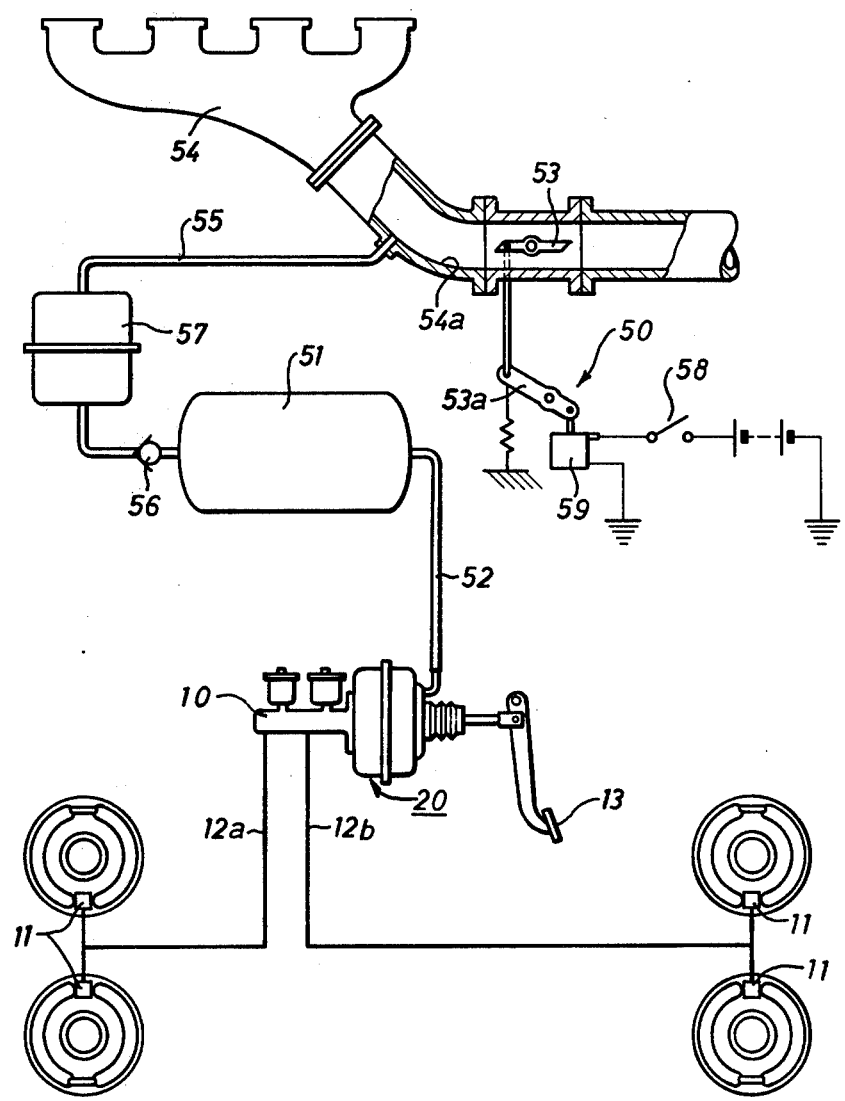
FIG. 1 is a diagrammatic view of a hydraulic braking system for a vehicle including a brake booster in accordance with the present invention.

Referring now to the accompanying drawings, FIG. 1 illustrates a hydraulic braking system for an automotive vehicle in which a tandem master cylinder 10 is actuated by a pneumatically operated brake booster 20 in accordance with the present invention. The master cylinder 10 is connected at its front and rear pressure chambers to front and rear wheel brake cylinders 11 by way of respective conduits 12a and 12b.

As shown in FIG. 2, the brake booster 20 comprises a power piston 40 and a flexible diaphragm member 41 assembled within a housing 30. The housing 30 has a front housing section 31 and a rear housing section 32. The rear housing section 32 is provided with an open-ended neck portion 32a and an inlet port 32b for connection to an accumulator 51 by a conduit 52 (see FIG. 1). The accumulator 51 is connected through a check valve 56 to an air cleaner 57 which is connected by a conduit 55 to a portion of an exhaust pipe 54a located between an exhaust manifold 54 and a cut-off valve 53 in the form of a butterfly valve for an exhaust braking device 50. The cut-off valve 53 is operatively connected to a solenoid actuator 59 by means of a spring-loaded linkage 53a. The solenoid actuator 59 is energized in response to closing of a manual switch 58 to close the cut-off valve 53.

The power piston 40 has a cylindrical body extended outwardly from the open-ended neck portion 32a of the housing 30 and is secured at its neck portion with an inner end of the diaphragm member 41. The cylindrical body of the power piston 40 is slidably supported by an annular seal member 33 secured to the inner wall of the neck portion 32a to guide axial movement of the piston 40. The outer periphery of the diaphragm member 41 is air-tightly clamped between the front and rear housing sections 31 and 32 so that the interior of the housing 30 is subdivided into a positive pressure chamber $R_1$ in open communication with the inlet port 32b and a variable pressure chamber $R_2$. The power piston 40 is provided at its center with an axial four-stepped bore $H_0$ opening into the variable pressure chamber $R_2$ through a passage 40a and is biased rearward by a compression spring 42 which is interposed between the inner wall of the front housing section 31 and a retainer 43 supported by the front end of the power piston 40. The four-stepped bore $H_0$ is in open communication with the positive pressure chamber $R_1$ by means of a passage 40b. Thus, the variable pressure chamber $R_2$ is selectively communicated with the positive pressure chamber $R_1$ in response to open and close of a valve assembly provided within the four-stepped bore $H_0$. An operating rod 80 is securely connected by a ring fastener 81 at its rear end with the center of the power piston 40 and is extended outwardly through a seal member 35 secured to the front housing section 31 to be connected with a piston (not shown) of the master cylinder 10. The rear end of the rod 80 is also received by a resilient member 82 disposed within the fourth stepped portion $H_4$ of the stepped bore $H_0$.

The valve assembly comprises a valve plunger 60 axially slidable within the second and third stepped portions $H_2$ and $H_3$ of the four-stepped bore $H_0$. The valve plunger 60 is provided at its rear end with an annular valve seat 60a engageable with a valve body 70 and is securely connected to a front spherical end of a push rod 62 which extends rearward through a rubber boot 34 to be operatively connected to a foot brake pedal 13, as shown in FIG. 1. In this assembly, rearward movement of the valve plunger 60 is restricted by a stopper member 61 secured to the power piston 40, and the push rod 62 is biased rearward by a compression spring 63 interposed between a retainer 64 of the push rod 62 and an annular retainer 71 secured to an inner shoulder of the four-stepped bore $H_0$. The boot 34 is secured at both ends thereof to the neck portion 32a of the housing 30 and a portion of the push rod 62 to cover the cylindrical body of the power piston 40. The boot 34 has exhaust ports 34a to communicate the four-stepped bore $H_0$ with the atmospheric air.

The valve body 70 of the valve assembly is hermetically secured at its base end to the inner wall of the stepped bore $H_0$ by the annular retainer 71. The valve body 70 has an annular valve part 70a which is biased forward by a compression spring 72 interposed between the retainer 71 and an annular plate 73 fixed to the valve part 70a.

OPERATION

Under inoperative condition of the brake booster 20, the push rod 62 and the valve plunger 60 are in their rearward stroke ends due to biasing force of the spring 63 to engage the valve seat 60a with the valve part 70a of the valve body 70. In this state, the variable pressure chamber $R_2$ is communicated with the positive pressure chamber $R_1$ through the passages 40a and 40b to be supplied therein with the compressed exhaust gases from the positive pressure chamber $R_1$. Thus, the power piston 40 is in its rearward stroke end due to biasing force of the spring 42, as shown in FIG. 2. In actual use of the brake booster 20, the accumulator 51 is previously charged with compressed exhaust gases from the exhaust pipe 54a through the air cleaner 57 and the check valve 56 in response to operation of the exhaust braking device 50.

Upon depression of the brake pedal 13, the push rod 62 and the valve plunger 60 are moved forward against biasing force of the spring 63 and simultaneously the valve body 70 is expanded due to biasing force of the spring 72. This engages the valve part 70a with the valve seat 40c to block the communication between the chambers $R_1$ and $R_2$. When the push rod 62 is further moved forward, the valve seat 60a separates from the valve part 70a to communicate the variable pressure chamber $R_2$ with the atmospheric air through the passage 40a, the interior of the valve body 70, the annular retainer 71 and the exhaust ports 34a of the boot 34. Then, the compressed exhaust gases in the variable pressure chamber $R_2$ are exhausted into the atmospheric air so that the power piston 40 is moved forward against biasing force of the spring 42 due to difference in pressure between the two chambers $R_1$ and $R_2$. Thus, the master cylinder 10 is operated by pushing force of the operating rod 80 to produce braking pressure in the respective conduits 12a and 12b.

When the brake pedal 13 is released, the push rod 62 and the valve plunger 60 are retracted rearward by biasing force of the spring 63 to engage the valve seat 60a with the valve part 70a so as to isolate the variable pressure chamber $R_2$ from the atmospheric air. Subsequently, the valve part 70a separates from the valve seat 40c by further rearward movement of the valve plunger 60 to communicate the variable pressure chamber $R_2$ with the positive pressure chamber $R_1$ through the passages 40a and 40b. Then, the variable pressure chamber $R_2$ is supplied therein with the compressed exhaust gases from the positive pressure chamber $R_1$ so that the power piston 40 is retracted in the original position by biasing force of the spring 42 to release braking pressure in the wheel brake cylinders 11.

Although the present invention has been illustrated and described in connection with a specific embodiment, various adaptations and modifications will become apparent to those skilled in the art from the description in conjunction with the appended claims without departing from the scope and spirit of the present invention.

What is claimed is:

1. A pneumatic brake booster for a wheeled vehicle having an internal combustion engine, a brake pedal and a master cylinder, the booster comprising:

a source of positive fluid pressure;
   a housing including an inlet port connected to said fluid pressure source;
   a power piston reciprocable within said housing and being provided at one side thereof with a cylindrical body extending outwardly from said housing and at the other side thereof with an operating rod securely connected to the power piston and extending outwardly from said housing, said cylindrical body having an axial bore opening outwardly and said operating rod being operatively connected with said master cylinder;
   a diaphragm member secured at the outer periphery thereof with the inner wall of said housing and at a radially inward portion thereof with said power piston to subdivide the interior of said housing into a positive pressure rear chamber and a variable pressure front chamber, said positive pressure chamber being in open communication with said inlet port and said variable pressure chamber being selectively communicated through said axial bore with said positive pressure chamber and with atmospheric pressure;
   a spring for biasing said power piston toward said positive pressure chamber;
   a valve plunger axially movable within said axial bore and operatively connectable with said brake pedal for movement thereby between a released position and an actuated position, said valve plunger having a first annular valve seat located in said axial bore;
   a valve body hermetically secured to the inner wall of said axial bore and having an annular valve part engageable with said first valve seat; and
   a second annular valve seat formed on an inner shoulder of said axial bore, the valve part of said valve body being in contact with said first valve seat in the released position of said valve plunger to communicate said variable pressure chamber with said positive pressure chamber through said axial bore and the valve part of said valve body engaging said second valve seat to isolate said positive pressure chamber from said axial bore upon movement of the valve plunger by the brake pedal toward the actuated position and thereafter said first valve seat separating from the valve part of said valve body to communicate said variable pressure chamber to the atmospheric pressure through said axial bore, whereby said power piston is actuated against the biasing action of said spring due to difference in pressure between said two chambers, and wherein said source of positive fluid pressure includes an accumulator connected to the inlet port of the housing; an exhaust pipe for connection to the engine, a bypass conduit between the exhaust pipe and the accumulator, a check valve in the bypass conduit to permit flow of exhaust gas from the exhaust pipe to the accumulator and to prevent reverse flow, a cutoff valve disposed within the exhaust pipe downstream of the bypass conduit connection to selectively block exhaust gases flowing through said pipe, and an electrically operated actuator operatively connected to said cutoff valve to open and shut said cutoff valve.

2. A pneumatic brake booster as claimed in claim 1, further comprising an air cleaner interposed between said exhaust pipe and said check valve.

* * * * *